United States Patent
Islas et al.

(10) Patent No.: US 11,242,270 B2
(45) Date of Patent: Feb. 8, 2022

(54) PORTABLE WATER TREATMENT SYSTEM USING OZONE

(71) Applicants: CLEAN TEAM HOLDINGS INC., Pasadena, CA (US); ECLEAN TECHNOLOGIES, LLC, La Canada, CA (US)

(72) Inventors: Alejandro Islas, San Gabriel, CA (US); William Lance Burrows, Big Bear Lake, CA (US)

(73) Assignees: CLEAN TEAM HOLDINGS INC., Pasadena, CA (US); ECLEAN TECHNOLOGIES, LLC, La Canada, CA (US)

( * ) Notice: Subject to any disclaimer, the term of this patent is extended or adjusted under 35 U.S.C. 154(b) by 10 days.

(21) Appl. No.: 16/759,719

(22) PCT Filed: Oct. 23, 2018

(86) PCT No.: PCT/US2018/057169
§ 371 (c)(1),
(2) Date: Apr. 27, 2020

(87) PCT Pub. No.: WO2019/084054
PCT Pub. Date: May 2, 2019

(65) Prior Publication Data
US 2020/0308031 A1 Oct. 1, 2020

Related U.S. Application Data

(60) Provisional application No. 62/578,231, filed on Oct. 27, 2017.

(51) Int. Cl.
*C02F 1/78* (2006.01)
*B01F 3/04* (2006.01)
*C02F 1/50* (2006.01)

(52) U.S. Cl.
CPC .............. *C02F 1/78* (2013.01); *B01F 3/0446* (2013.01); *C02F 1/50* (2013.01);
(Continued)

(58) Field of Classification Search
CPC ...... C02F 1/50; C02F 1/78; B01F 3/04; B01F 3/0446
See application file for complete search history.

(56) References Cited

U.S. PATENT DOCUMENTS

| | | | |
|---|---|---|---|
| 4,555,335 A | 11/1985 | Burris | |
| 6,576,096 B1 | 6/2003 | Andrews et al. | |

(Continued)

FOREIGN PATENT DOCUMENTS

| | | | | |
|---|---|---|---|---|
| CN | 202508507 U | * | 10/2012 | ............ A61L 9/015 |
| CN | 208545173 U | * | 2/2019 | |
| WO | 2004063100 A2 | | 7/2004 | |

OTHER PUBLICATIONS

PCT International Application No. PCT/US2018/057169, International Search Report and Written Opinion dated Jan. 7, 2019. 8 pages.

*Primary Examiner* — Robert A Hopkins
(74) *Attorney, Agent, or Firm* — Loza & Loza, LLP; Derek Yeung

(57) ABSTRACT

An apparatus is configured to introduce ozone into water. The apparatus includes an ozone source that is configured to provide ozone. The apparatus further includes an air pump that is operatively coupled with the ozone source to provide an air stream mixed with the ozone at a pressure greater than atmospheric pressure. The apparatus further includes an ozone distributor pneumatically coupled with the air pump to introduce the ozone-mixed air stream into the water. The ozone distributor includes a porous tube set in a tortuous configuration.

12 Claims, 4 Drawing Sheets

(52) U.S. Cl.
CPC ............... *B01F 2003/04886* (2013.01); *B01F 2215/0052* (2013.01); *C02F 2201/782* (2013.01); *C02F 2201/784* (2013.01); *C02F 2303/04* (2013.01); *C02F 2307/02* (2013.01); *C02F 2307/04* (2013.01)

(56) References Cited

U.S. PATENT DOCUMENTS

| | | |
|---|---|---|
| 7,875,173 B1 | 1/2011 | Barnes |
| 2003/0071069 A1 | 4/2003 | Shelton |
| 2009/0071983 A1 | 3/2009 | Pritchard |

* cited by examiner ved with ozone. Ozone is commonly used to treat and disinfect water.

PORTABLE WATER TREATMENT SYSTEM USING OZONE

CROSS-REFERENCE TO RELATED APPLICATIONS

This application is the U.S. National Stage of International Patent Application No. PCT/US2018/057169 filed on Oct. 23, 2018, which claims the benefit of priority from U.S. Provisional Patent Application No. 62/578,231 filed on Oct. 27, 2017, the disclosures of the foregoing applications being incorporated herein by reference in their entirety for all applicable purposes.

BACKGROUND

Ozone contains three atoms of oxygen ($O_3$) that is different than the two atoms oxygen ($O_2$) in breathable air. Ozone may also be known as "activated oxygen." The oxidizing properties of ozone can reduce or eliminate taste and odor problems. Furthermore, ozone is a powerful sterilant that can be used as an effective disinfectant. In some applications, ozone can effectively kill bacteria, viruses, microorganisms, and many other pathogens. Ozone is commonly used to treat and disinfect water.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. In some aspects, the tortuous configuration may be a coiled shape, a helical shape, a spiral shape, a circular shape, or a wound shape. In some aspects, the ozone distributor may include a housing containing the porous tube in the tortuous configuration, and the porous tube when extended is substantially longer than the housing in a length direction.

Aspects of the present disclosure provide an apparatus for introducing ozone into water. The apparatus includes an ozone source that is configured to provide ozone. The apparatus further includes an air pump that is operatively coupled with the ozone source to provide an air stream mixed with the ozone at a pressure greater than atmospheric pressure. The apparatus further includes an ozone distributor pneumatically coupled with the air pump to introduce the ozone-mixed air stream into the water. The ozone distributor includes a porous tube set in a tortuous configuration.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
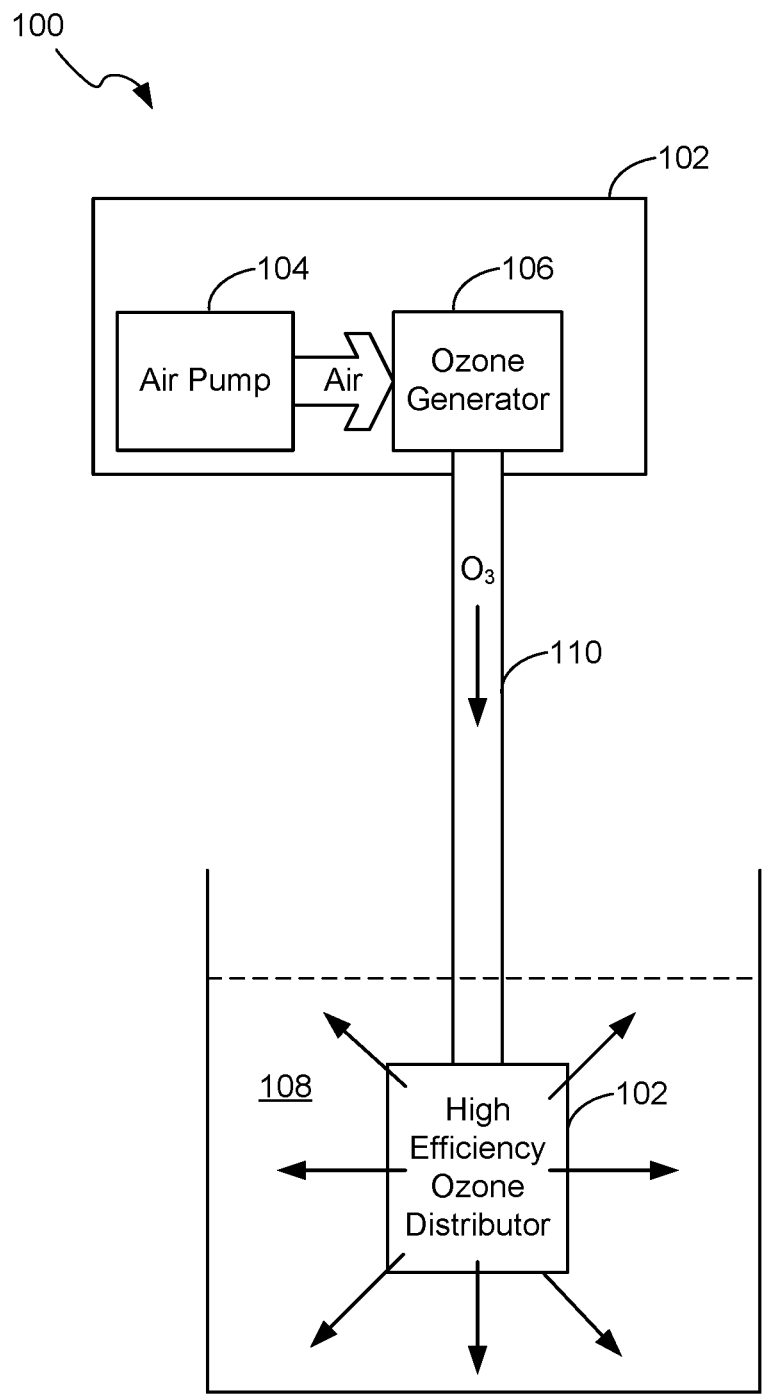
FIG. 1 is a diagram illustrating a portable water treatment system according to one embodiment.

Referring now to the drawings, embodiments of systems and methods of a portable water treatment system using ozone as a sterilant or disinfectant are disclosed in the present disclosure. The water treatment system is portable with all the working components being self-contained in an easy to carry unit that can be powered from standard AC power. This water treatment system can be used to effectively disinfect standing water in handheld style containers, for example, water bottles, pitchers, decanters, and personal and family size containers.

FIG. 1 is a diagram illustrating a water treatment system 100 using ozone according to one embodiment. The water treatment system 100 includes a base module 102 and an ozone distributor 102. The base module 102 includes an air pump 104 and an ozone generator 106 for generating ozone (e.g., $O_3$). In operation, the air pump 104 generates an air stream that is mixed with the ozone generated by the ozone distributor 102. The air stream may have a pressure greater than atmospheric pressure or any desired pressure. The ozone distributor 102 can be submerged in a body of standing water 108 to be treated or disinfected with ozone. The ozone-mixed air is directed from the base module 102 (e.g., air pump) to the ozone distributor 102 via a pneumatically sealed hose or tube 110 of any desired length and/or shape. The ozone distributor 102 is designed and shaped to diffuse a large amount of ozone to effectively disinfect a small body of standing water, which may be stored in a small or portable container. In particular, the ozone distributor 102 can inject a large amount of ozone-mixed air bubbles into the water 108 to achieve effective and efficient disinfection of the water using ozone. In one embodiment, the ozone distributor 102 includes a diffuser or bubbler that provides a very large porous surface to volume ratio such that a large amount of ozone-mixed air can be diffused into water through the diffuser at a very high rate.

Figure 2:
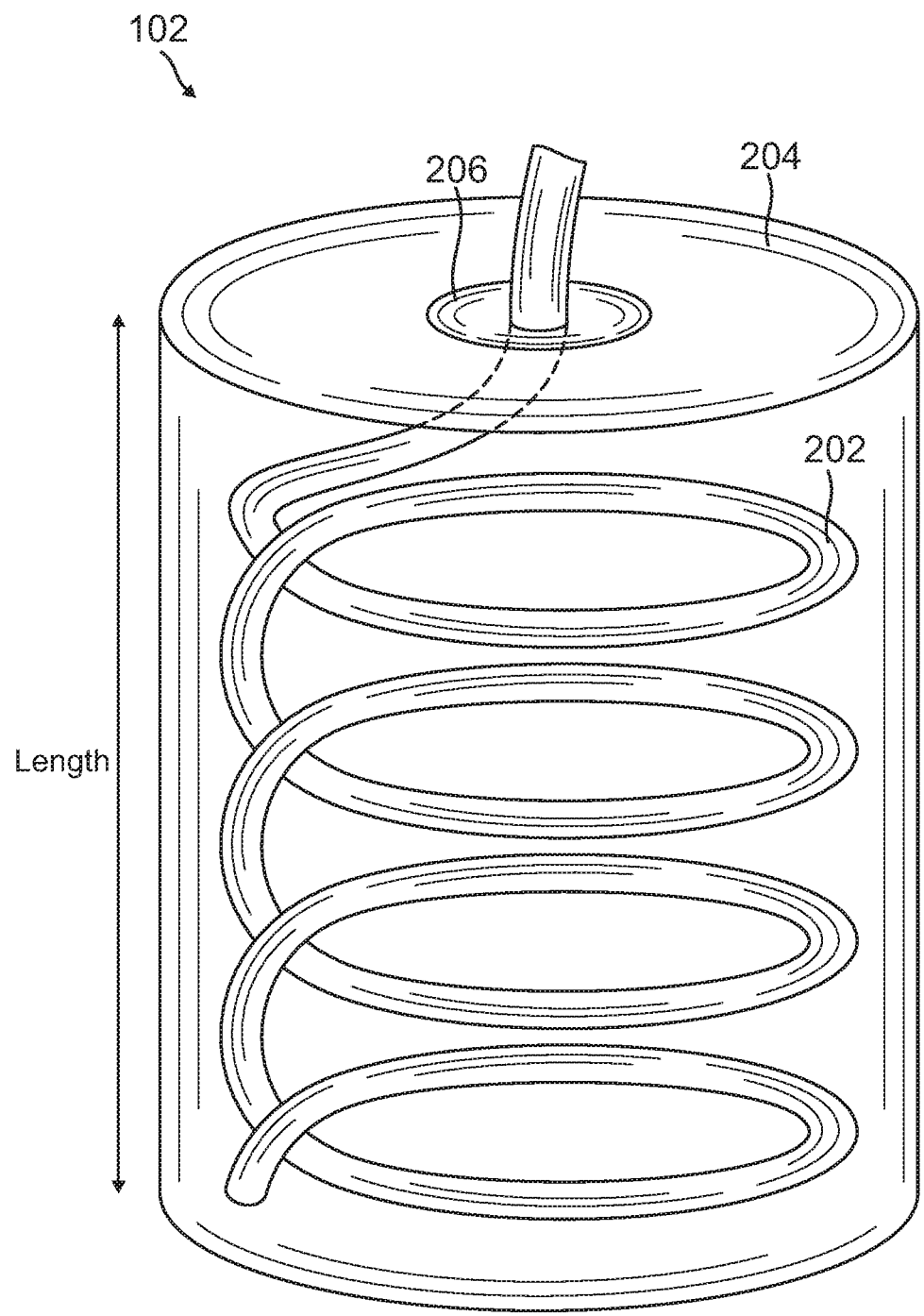
FIG. 2 is a diagram illustrating a high-efficiency ozone distributor according to one embodiment.

FIG. 2 is a diagram illustrating some components of the ozone distributor 102 according to one embodiment. The ozone distributor 102 includes a porous tube 202 (diffuser) in a housing 204. The porous tube 202 may be connected to the hose 101 (see FIG. 1) via an inlet, connector, or coupler 206. The porous tube 202 when extended is substantially longer than the length and/or width of the housing 204. In this particular example, the porous tube 202 is coiled or wound to fit into the housing 204. The housing 204 has openings (e.g., porous portion 302 in FIG. 3) that allow water to enter the housing when the ozone distributor 102 is submerged in water. That is, the openings allow the porous tube 202 to be submerged in water. In other examples, the porous tube 202 may have other tortuous configurations like a wound shape, helical shape, bend shape, circular shape, rolled shape, spiral shape, and other suitable shapes to maximize the length of the porous tube 202 in the housing 204. By maximizing the length of the porous tube 202 that can be fitted into the housing 204, a ratio of the surface area of the porous tube 202 to the volume of the housing can be increased. Therefore, the efficiency or rate of ozone diffusion of the ozone distributor 102 can be increased. In some embodiments, the water treatment system 100 can provide about 100 liters of ozone-mixed air per minute using the ozone distributor 102.

Figure 3:
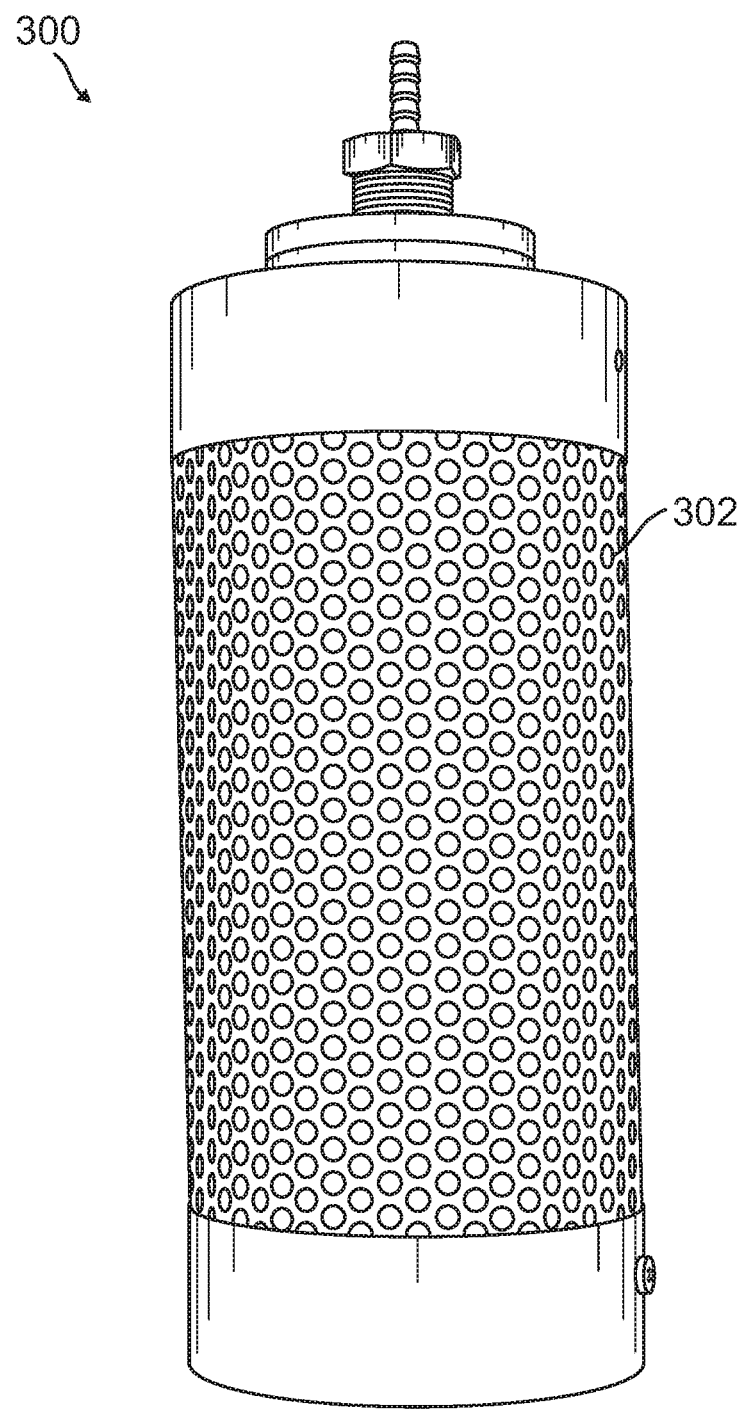
FIGS. 3 and 4 are diagrams illustrating an exemplary high-efficiency ozone distributor according to one embodiment.
Figure 4:
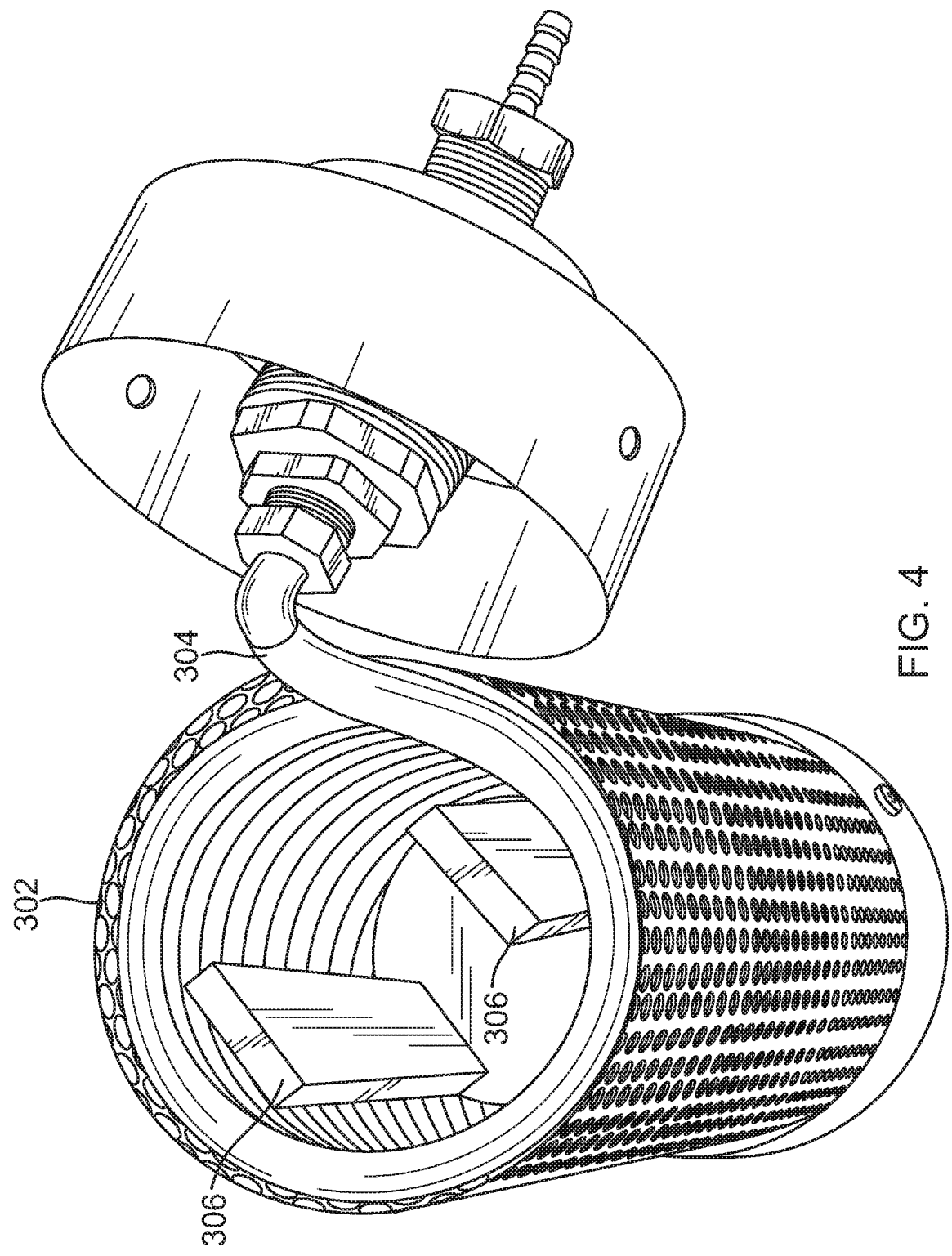

FIGS. 3 and 4 are diagrams illustrating an exemplary ozone distributor 300 according to one embodiment. FIG. 3 is a side view of the ozone distributor 300. FIG. 4 is a top view showing some components inside the ozone distributor 300. In this embodiment, the housing of the ozone distributor 300 has a porous portion 302 that allows water to enter the housing freely when the ozone distributor 300 is submerged in water. For example, the porous portion 302 has a plurality of circular openings or holes that are evenly distributed. In other examples, the openings may have other desired patterns and shapes. When ozone-mixed air is supplied to the porous tube 304 (see FIG. 4) arranged in a tortuous configuration (e.g., coiled or wound) inside the housing, a large amount of ozone-mixed air bubbles may be generated in the water when submerged. The porous tube 304 may be secured to the housing by one or more brace members 306. The brace members 306 are positioned and configured to hold and secure the porous tube 304 close to the inside surface (e.g., porous portion 302) of the housing to improve ozone diffusion efficiency.

In one example, two brace members 306 are located at opposite sides inside the housing and extend in a length direction of the housing. In other examples, two or more brace members 306 may be used. Two brace members 306 are shown as rectangular bars in FIGS. 3 and 4. In other examples, the brace members 306 may have other suitable shapes, for example, a rod shape and a plate shape. The porous tube 304 is arranged to be between the porous portion 302 and the brace members 306. In one example, no porous tube 304 runs in the middle portion of the housing defined by the brace members 306. In one example, the porous tube 304 is wound in a configuration substantially defined by the internal wall, profile, or shape of the housing or porous portion 302. To that end, a majority of the porous tube 304 is proximate the porous portion 302. For example, the housing (porous portion 302) of the ozone distributor 300 in FIGS. 3 and 4 has a cylindrical shape, and the porous tube 304 is also wound in a cylindrical shape defined by the internal shape of the housing.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. An apparatus for introducing ozone into water, comprising:
   an ozone source configured to provide ozone;
   an air pump operatively coupled with the ozone source to provide an air stream mixed with the ozone at a pressure greater than atmospheric pressure; and
   an ozone distributor pneumatically coupled with the air pump to introduce the ozone-mixed air stream into the water,
   wherein the ozone distributor comprises a porous tube set in a tortuous configuration.

2. The apparatus of claim 1, wherein the tortuous configuration comprises at least one of:
   a coiled shape;
   a helical shape;
   a spiral shape;
   a circular shape; or
   a wound shape.

3. The apparatus of claim 1, wherein the ozone distributor further comprises:
   a housing containing the porous tube, wherein the porous tube when extended is substantially longer than the housing in a length direction.

4. The apparatus of claim 3, wherein the housing has a plurality of openings on an external surface for allowing contact between the porous tube and water.

5. The apparatus of claim 3, wherein the ozone distributor further comprises:
   at least one brace member that secures a majority of the porous tube in a position close to an external surface of the housing.

6. The apparatus of claim 1, wherein the ozone distributor is configured to provide about 100 liters of ozone-mixed air per minute.

7. An ozone diffuser comprising:
   a housing; and
   an ozone distributor inside the housing,
   wherein the ozone distributor comprises a porous tube set in a tortuous configuration inside the housing, and the porous tube when extended is substantially longer than the housing in a length direction, and
   wherein the housing has a plurality of openings on an external surface for allowing contact between the porous tube and water.

8. The ozone diffuser of claim 7, wherein the tortuous configuration comprises at least one of:
   a coiled shape;
   a helical shape;
   a spiral shape;
   a circular shape; or
   a wound shape.

9. The ozone diffuser of claim 7, wherein the ozone distributor further comprises:
   at least one brace member that secures a majority of the porous tube in a position close to the external surface of the housing.

10. The ozone diffuser of claim 7, wherein the ozone distributor is configured to provide about 100 liters of ozone-mixed air per minute.

11. A method of introducing ozone into water, comprising:
    generating ozone;
    mixing the ozone with air at a pressure greater than atmospheric pressure; and
    diffusing the ozone-mixed air into water using a porous tube set in a tortuous configuration.

12. The method of claim 11, wherein the tortuous configuration comprises at least one of:
    a coiled shape;
    a helical shape;
    a spiral shape;
    a circular shape; or
    a wound shape.

* * * * *